United States Patent Office 3,207,781
Patented Sept. 21, 1965

3,207,781
MANUFACTURE OF SODIUM CYCLOHEXYL-
SULFAMATE FREE OF SULFATES
Vipin Dhirajlal Shah, Waukegan, Ill., assignor to Abbott Laboratories, North Chicago, Ill., a corporation of Illinois
No Drawing. Filed June 17, 1963, Ser. No. 288,556
3 Claims. (Cl. 260—500)

This invention relates to the manufacture of sodium cyclohexylsulfamate. More particularly, it relates to the manufacture of sodium cyclohexylsulfamate substantially free of sulfates.

In the past, various processes have been used and exploited for the manufacture of cyclohexylsulfamic acid and its salts. In most of these processes, cyclohexylamine is used as the starting material and is reacted with a sulfonating agent. Among the sulfonating agents commonly used are sulfamic acid, chlorosulfonic acid, sulfur trioxide, and the like. Unfortunately, the reaction between sulfuric acid or its derivatives on the one hand, and cyclohexylamine on the other hand, produces a number of undesirable by-products, aside from the desired cyclohexylamine-N-cyclohexylsulfamate (hereinafter simply referred to as "double salt"). The latter by simple hydrolysis produces cyclohexylsulfamic acid or its salts. In spite of the fact that the "double salt" is obtained in very good yields, it still has to be purified and the various by-products have to be eliminated. Depending on the coreactant of cyclohexylamine, one by-product may occur in larger amounts than others.

The most economical reactants for producing the above "double salt" are cyclohexylamine and sulfur trioxide. Unfortunately, the reaction product obtained with sulfur trioxide contains larger amounts of cyclohexylamine sulfate than when other coreactants, e.g. sulfamic acid, are used for making "double salt." Unfortunately, cyclohexylamine sulfate has physical characteristics similar to those of the "double salt" which make the separation of the two very cumbersome, expensive and impractical. While a small amount of cyclohexylamine sulfate can be tolerated in the "double salt"/cyclohexylamine sulfate mixture, an amount greater than about 2.1% is not economically acceptable because of the difficulty and expense involved in its removal. The alkaline hydrolysis which converts the "double salt" into cyclohexylamine and an alkaline salt of cyclohexylsulfamic acid also hydrolyzes the cyclohexylamine sulfate, producing cyclohexylamine and the corresponding sulfate salt. When the desired end product is sodium cyclohexylsulfamate, the other hydrolysis product is sodium sulfate which heretofore has been extremely difficult to remove from sodium cyclohexylsulfamate. Fractional crystallization may be employed for this separation, but its use does not permit a complete or economic recovery of sodium cyclohexylsulfamate.

It is thus an object of the present invention to produce sodium cyclohexylsulfamate substantially free of sodium sulfate. It is another object of the present invention to provide a process for the substantial removal of sodium sulfate from the reaction mixture obtained when "double salt" is hydrolyzed with sodium hydroxide. It is a further object of the present invention to provide a process for the substantial removal of sodium sulfate from sodium cyclohexylsulfamate in an economical operation.

These and other objects are accomplished by removing substantially all sodium sulfate from an aqueous mixture of sodium cyclohexylsulfamate and sodium sulfate by adding to said solution sufficient sodium hydroxide to produce a liquid phase containing 10–18 grams of free sodium hydroxide per 100 ml., filtering the precipitated sodium cyclohexylsulfamate from the formed slurry, and washing the filter cake. By determining the proper amount of sodium hydroxide in accordance with the present invention, filtering at a temperature between 0° and 30° C., and washing the filter-cake with about 10–20 cc. of water per 100 grams of precipitate, substantially all of the sodium cyclohexylsulfamate precipitates while the sodium sulfate remains dissolved in the liquid phase.

The above defined process, surprisingly, not only precipitates excellent quality sodium cyclohexylsulfamate substantially free of sodium sulfate, but almost all discolorations accrued during this and previous operations leading to sodium cyclohexylsulfamate remain dissolved in the liquid phase and are eliminated by the filtration step following the addition of the calculated amount of sodium hydroxide.

The complete reaction scheme leading to sodium cyclohexylsulfamate wherein the present invention is a part, is briefly outlined hereinafter to better explain the procedure of this invention: cyclohexylamine and a sulfonating agent are reacted under known conditions to produce "double salt." The resulting liquid is concentrated to remove some of the excess cyclohexylamine and water is added in an amount equalling about 15–20% of the amount of cyclohexylamine. Sodium hydroxide is then added to the concentrated mixture in an amount exceeding the stoichiometric amount by about 5%. The resulting liquid containing water, "double salt," cyclohexylamine, sodium cyclohexylsulfamate, sodium hydroxide and sodium sulfate, is then worked up by known means to complete the conversion of "double salt" to sodium cyclohexylsulfamate and to eliminate the dissolved cyclohexylamine from the solution. In a large-scale operation, substantially all cyclohexylamine is removed and the resulting aqueous solution has a concentration of about 40% solids of which about 7% is sodium sulfate and about 93% is sodium cyclohexylsulfamate.

It will be readily understood from the foregoing disclosure that the amount of sodium hydroxide to be added for substantially complete elimination of the sodium sulfate is dependent on the amount of solution or slurry initially present and the amount of sodium sulfate contained therein. As a simple exemplification, 1400 grams of an aqueous slurry containing 400 grams of sodium cyclohexylsulfamate and 30 grams of sodium sulfate would result in a filtrate of approximately 1000 grams which requires, according to the above definition, 100–180 grams of sodium hydroxide to make up a filtrate with 10–18% of sodium hydroxide concentration. Adding 150 grams of sodium hydroxide will then precipitate substantially all sodium cyclohexylsulfamate while the sodium sulfate and most colored bodies remain in solution. If the sodium hydroxide so calculated is to be added as an aqueous solution, obviously the amount of filtrate (or liquid phase) also increases. A practical way to determine the amount of aqueous sodium hydroxide to be added is the formula $$X = \frac{100}{c} \times \frac{a}{1 - a/b}$$

wherein X is the amount of the sodium hydroxide solution needed (in grams), a is the amount calculated to be added as solid sodium hydroxide (in grams), c is the concentration of the sodium hydroxide solution (in weight-percent), and b is the weight of the aqueous solution (in grams). With the above example, the amount X is thus $$X = \frac{100}{50} \times \frac{150}{1 - 150/1000}$$

or 353 grams (232 ml.) of the 50% aqueous solution of sodium hydroxide.

The amount of sodium hydroxide needed to produce the desired filtrate, however, does not have to be calculated; it can also be determined by removing an aliquot from the initial solution and adding the amount necessary to produce a filtrate containing the required amount of sodium hydroxide. This method may be preferred where the amount of cyclohexylsulfamate and/or the weight of the solution is not known.

Four of the above slurries were heated to 70° C. whereupon dissolution of the solids occurred and the amount of 50% aqueous sodium hydroxide solution indicated in the table was added to each solution. The mixtures were then cooled, and the precipitates were filtered off. All filtrates were analyzed (before washing) for their content of sodium cyclohexylsulfamate (S–CHS) and sodium sulfate ($Na_2SO_4$).

|     | NaOH added as 50% aq. soln., cc. | S–CHS in— | | $Na_2SO_4$ in— | | NaOH in Filtrate, |
| --- | --- | --- | --- | --- | --- | --- |
|     |     | Cake, g. | Filtrate, g. | Cake, g. | Filtrate, g. |     |
| (a) | 120 | 193 | 7 | 3.5 | 17.5 | 14.7 |
| (b) |     | 138 | 62 | 5.0 | 16.0 |     |
| (c) | 96  | 186 | 14 | 4.0 | 17.0 | 11.0 |
| (d) | 140 | 199 | 1 | 3.0 | 18.0 | 16.0 |

For practical purposes, the amount of sodium hydroxide to be added is usually such that the obtained filtrate after precipitation and removal of the sodium cyclohexylsulfamate contains about 11–16 grams of sodium hydroxide per hundred milliliters of filtrate.

When adding the sodium hydroxide necessary according to the present invention, substantially all of the initially present sodium cyclohexylsulfamate precipitates and it can then be isolated in conventional manner by filtration, centrifuging or other known means for separating solids from liquids. The liquid phase withdrawn at this point contains a substantial amount of the sodium sulfate initially present in the hydrolysis mixture and a large percentage of the color bodies as well as other by-products obtained in small quantities, but practically none of the sodium cyclohexylsulfamate. The latter, being precipitated and isolated in this manner, is washed with 0.1–0.2 part of water per part of sodium cyclohexylsulfamate which removes substantially all of the sodium sulfate therefrom. The precipitate is then recrystallized from water after treatment with activated carbon at a pH of about 6.5. The necessary pH adjustment is made by the addition of the required amount of a commercially available acid such as acetic acid, hydrochloric acid, etc. This recrystallization step produces pure sodium cyclohexylsulfamate in excellent yields. The recrystallization mother-liquor, containing some sodium cyclohexylsulfamate, is then concentrated and combined with the hydrolysis solution of a subsequent batch to go into the caustic precipitation step described above for the primary purification of sodium cyclohexylsulfamate. In this manner, substantially no loss of sodium cyclohexylsulfamate occurs, while the discolorations, the sodium sulfate, and other unwanted salts are almost completely removed. The recrystallized sodium cyclohexylsulfamate obtained by these operations is ready for use as an artificial sweetner without further processing: it is a snow-white crystalline product containing no sodium sulfate or only trace quantities thereof.

To show in a comparative test the effect of the present invention, reference is made to the following examples which are given here only as illustrations and are not meant to limit the invention in any respect.

*Examples*

Slurries, each containing 200 grams of sodium cyclohexylsulfamate and 21 grams of sodium sulfate and weighing 750 grams, were used in this separation procedure. After deducting for the cyclamate, 550 grams of solution was used as the basis to determine the required amount of sodium hydroxide. To produce a filtrate containing 14.2 grams (arbitrary figure within the range of 10–18 grams) of sodium hydroxide per 100 ml., 81 grams thereof had to be added to the initial solution. Since it was desired to add this amount of sodium hydroxide as a 50% aqueous solution, the above formula was used to calculate the appropriate amount. The thus determined amount was 190 grams or 124 ml. of the 50% sodium hydroxide solution.

After washing the filter-cakes with 20 ml. of water in each instance, only traces of sodium sulfate were left therein, except for sample *b*.

It is seen from the above examples that over 90% of the total sodium cyclohexylsulfamate was precipitated with the appropriate amount of sodium hydroxide according to the present invention, while only 69% was recovered by ordinary crystallization. Substantially sulfate-free sodium cyclohexylsulfamate was obtained without recrystallization except in sample *b* which not only produced a very inferior yield in total sodium cyclohexylsulfamate recovery, but washing the filter-cake with similarly small quantities of water did not remove all of the sodium sulfate, so that the result of that sample was inferior in yield and quality of cyclohexylsulfamate.

It will be seen from the above examples that by adding amounts of sodium hydroxide producing a filtrate containing 11–16% of sodium hydroxide, excellent results are obtained. The acceptable range extends from about 10% to about 18% or even higher, but when the concentration of sodium hydroxide is much above 18%, the slurry becomes very viscous and difficult to filter. Furthermore, there is no advantage gained by using an amount of caustic larger than that giving a filtrate of 18% sodium hydroxide concentration since no additional sodium cyclohexylsulfamate precipitates.

Among the advantages of the present invention are, as outlined above, (a) the production of substantially color-free crystals of sodium cyclohexylsulfamate, (b) the simultaneous removal of substantially all sodium sulfate, and (c) the very high recovery yield for sodium cyclohexylsulfamate of highest quality and purity. Furthermore, the process of the present invention is very economical since no additional chemicals are used: the discolored filtrate from the sulfate removal step can be concentrated to contain about 50% solids whereby most impurities precipitate, so that this solution can be filtered and the filtrate re-used as the 50% sodium hydroxide solution used in several steps of the over-all production of sodium cyclohexylsulfamate.

As shown above, the sodium hydroxide can be introduced in the present process as a solid or as an aqueous solution. The latter may be somewhat preferred for easier handling. For best results, the sodium hydroxide is added at elevated temperature to the mixture containing sodium cyclohexylsulfamate and sodium sulfate so that the solids are dissolved at that point. However, sodium hydroxide may also be added to the cold slurry and the temperature may then be raised to dissolve the formerly solid particles. Before filtration, the mixture is adjusted to room temperature or a temperature between 0° and 30° C. which will result in almost quantitative precipitation of the sodium cyclohexylsulfamate.

The process of the present invention also permits removal of other anions, commonly introduced during commercial manufacture, along with sulfate from the mixture of cyclamate and sulfate. This is of importance since, as outlined above, the recrystallization filtrate which contains these anions is reintroduced into the process of the present invention. Thus, the present process is particularly useful for a continuous operation to which it is easily adapted.

Others may practice the invention in any of the numerous ways which will be suggested to one skilled in the art by the present disclosure. All such practice of the invention shall be considered a part hereof as long as it falls within the scope of the appended claims.

I claim:

1. The process of removing substantially all sodium sulfate from an aqueous mixture of sodium cyclohexylsulfamate and sodium sulfate, comprising adding sufficient NaOH to produce an aqueous phase containing between 10 and 18 grams of free NaOH per 100 ml., filtering the precipitated sodium cyclohexylsulfamate from the formed slurry at a temperature between 0° and 30° C., and washing the precipitate wtih 10–20 parts by volume of water per 100 parts by weight of said precipitate.

2. The process of claim 1 wherein said sodium hydroxide is added as an aqueous solution.

3. The process of claim 1 wherein said sodium hydroxide is added to said aqueous mixture at elevated temperature.

No references cited.

LEON ZITVER, *Primary Examiner.*

UNITED STATES PATENT OFFICE
CERTIFICATE OF CORRECTION

Patent No. 3,207,781 September 21, 1965

Vipin Dhirajlal Shah

It is hereby certified that error appears in the above numbered patent requiring correction and that the said Letters Patent should read as corrected below.

Column 3, line 53, for "sweetner" read -- sweetener --; column 4, in the table, seventh column, lines 1, 3 and 4 thereof, for "14.7", "11.0" and "16.0", respectively, read -- 14.7% --, -- 11.0% -- and 16.0% --, respectively; column 6, line 4, for "wtih" read -- with --.

Signed and sealed this 19th day of April 1966.

(SEAL)
Attest:

ERNEST W. SWIDER
Attesting Officer

EDWARD J. BRENNER
Commissioner of Patents